(12) United States Patent
Reade et al.

(10) Patent No.: US 7,617,132 B2
(45) Date of Patent: *Nov. 10, 2009

(54) RFID SYSTEM AND METHOD FOR ENSURING FOOD SAFETY

(75) Inventors: Walter C. Reade, Appleton, WI (US); Jeff Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 520 days.

This patent is subject to a terminal disclaimer.

(21) Appl. No.: 10/301,513

(22) Filed: Nov. 21, 2002

(65) Prior Publication Data

US 2004/0103043 A1    May 27, 2004

(51) Int. Cl.
G06F 17/30    (2006.01)

(52) U.S. Cl. .......................................... 705/27; 705/26

(58) Field of Classification Search ............... 705/26–27
See application file for complete search history.

(56) References Cited

U.S. PATENT DOCUMENTS

| | | | |
|---|---|---|---|
| 4,656,463 A | 4/1987 | Anders et al. | |
| 5,047,614 A | 9/1991 | Bianco | |
| 5,164,707 A | 11/1992 | Rasmussen et al. | |
| 5,361,070 A | 11/1994 | McEwan | |
| 5,380,991 A | 1/1995 | Valencia et al. | |
| 5,478,989 A * | 12/1995 | Shepley | 235/375 |
| 5,677,927 A | 10/1997 | Fullerton et al. | |
| 5,687,169 A | 11/1997 | Fullerton | |
| 5,711,160 A | 1/1998 | Namisniak et al. | |
| 5,727,153 A | 3/1998 | Powell | |
| 5,798,694 A | 8/1998 | Reber et al. | |
| 5,819,735 A * | 10/1998 | Mansfield et al. | 600/300 |
| 5,832,035 A | 11/1998 | Fullerton | |
| 5,918,211 A | 6/1999 | Sloane | |
| 5,942,977 A | 8/1999 | Palmer et al. | |
| 5,955,969 A | 9/1999 | D'Hont | |
| 5,990,794 A | 11/1999 | Alicot et al. | |
| 6,037,879 A | 3/2000 | Tuttle | |
| 6,177,903 B1 | 1/2001 | Fullerton et al. | |

(Continued)

FOREIGN PATENT DOCUMENTS

DE    29714999    11/1997

(Continued)

OTHER PUBLICATIONS

Canada NewsWire; "Nutrition labeling needs improvement," Jul. 12, 1999, Proquest #43080606, 3pgs.*

(Continued)

*Primary Examiner*—Robert M. Pond
(74) *Attorney, Agent, or Firm*—Dority & Manning, P.A.

(57) ABSTRACT

A method and system are provided to aid consumers having food allergies, or other dietary concerns. An RFID system is used to provide consumers with food product information. The food products are provided with smart tags. The tags containing information regarding the food product that is of interest to consumers with allergies or dietary concerns. A smart tag scanner is used to retrieve the food product information from the smart tags. The consumers scan a potential food product with the scanner and, based on the retrieved food product information, make an informed decision as to whether to purchase or consume the food product.

24 Claims, 3 Drawing Sheets

U.S. PATENT DOCUMENTS

| | | | |
|---|---|---|---|
| 6,195,006 B1 | 2/2001 | Bowers et al. | |
| 6,218,979 B1 | 4/2001 | Barnes et al. | |
| 6,226,619 B1 | 5/2001 | Halperin et al. | |
| 6,249,227 B1 | 6/2001 | Brady et al. | |
| 6,294,997 B1 | 9/2001 | Paratore et al. | |
| 6,354,493 B1 | 3/2002 | Mon | |
| 6,386,450 B1 | 5/2002 | Ogasawara | |
| 6,407,665 B2 | 6/2002 | Maloney | |
| 6,409,086 B1 | 6/2002 | Pellauumail et al. | |
| 6,429,768 B1 | 8/2002 | Flick | |
| 6,435,407 B1 | 8/2002 | Fiodelisi | |
| 6,446,049 B1 | 9/2002 | Janning et al. | |
| 6,451,154 B1 | 9/2002 | Grabau et al. | |
| 6,491,217 B2* | 12/2002 | Catan | 235/375 |
| 6,497,656 B1 | 12/2002 | Evans et al. | |
| 6,507,279 B2 | 1/2003 | Loof | |
| 6,587,835 B1 | 7/2003 | Treyz et al. | |
| 6,640,214 B1 | 10/2003 | Nambudiri et al. | |
| 6,652,455 B1* | 11/2003 | Kocher | 600/300 |
| 6,693,511 B1 | 2/2004 | Seal | |
| 6,693,539 B2 | 2/2004 | Bowers et al. | |
| 6,694,177 B2 | 2/2004 | Eggers et al. | |
| 6,707,376 B1 | 3/2004 | Patterson et al. | |
| 6,707,381 B1 | 3/2004 | Maloney | |
| 6,754,504 B1* | 6/2004 | Reed | 455/517 |
| 6,970,827 B2* | 11/2005 | Zeltzer et al. | 705/2 |
| 7,171,378 B2* | 1/2007 | Petrovich et al. | 705/26 |
| 2002/0040321 A1 | 4/2002 | Nicholson | |
| 2002/0065680 A1 | 5/2002 | Kojima et al. | |
| 2002/0070862 A1 | 6/2002 | Francis et al. | |
| 2002/0139846 A1* | 10/2002 | Needham et al. | 235/383 |
| 2005/0091124 A1* | 4/2005 | White | 705/26 |

FOREIGN PATENT DOCUMENTS

| | | |
|---|---|---|
| DE | 19742126 | 3/1999 |
| WO | WO 0169429 A2 | 9/2001 |
| WO | WO 0215073 | 2/2002 |
| WO | WO 0215073 A1 | 2/2002 |
| WO | WO 0248955 A1 | 6/2002 |
| WO | WO 02080060 | 10/2002 |
| WO | WO 02080060 A1 | 10/2002 |
| WO | WO 0065532 A1 | 11/2002 |

OTHER PUBLICATIONS

Lennard, David; Product packaging: a visible problem,: Consumer Policy Review, Nov./Dec. 2001, v11,i6,p. 220, Proquest #97809783, 12pgs.*
Frontline Solutions; "Radio Frequency Identification," 201, v2i7p. 8, Proquest #75175683, 3pgs.*
Jancsurak, Joe; "Packaging intelligence in labels," Appliance Manufacturer, Jul. 2001, v49i7p. 46, Proquest #75473574, 5pgs.*
Advertisement—WWW.MOBILECLOAK.COM—mCloak—RFID Tolltags Etc., Copyrighted—2002.
Advertisement—WWW.MOBILECLOAK.COM—RFID Tags, Copyrighted—2002.
Ultra-Wideband Technology for Short-or Medium-Range Wireless Communications, Copyrighted—2001 Intel Corporation.
Ultra Wideband: The Ultimate Disruptive Technology, WWW.ULTRAWIDEBANDPLANET.COM—Jun. 11, 2002—INT Media Group.
U.S. Approves Ultra-Wideband Technology, WWW.WIRELESSNEWSFACTOR.COM—Feb. 15, 2002.
New Public Safety Applications and Broadband Internet Access Among Uses Envisioned by FCC Authorization of Ultra-Wideband Technology, Federal Communications Commission—Feb. 14, 2002.
Ultra Wideband—SEARCHNETWORKING.COM, Copyrighted 2000-2002—Techtarget.
Internet Article—WWW.TIMEDOMAIN.COM -PulsON Technology Capabilities, Sep. 3, 2002.
White Paper—Integration of Auto-ID Tagging System With Holonic Manufacturing Systems—Cambridge University Auto-ID Center, Published—Sep. 1, 2001.
Auburn University—Detection & Food Safety Center—AUDFS.ENG.AUBURN.EDU, Sep. 4, 2002.
Internet Article—Smart Tags Indicate Freshness—COURSES.CHE.UMN.EDU, Sep. 4, 2002.
Internet Article—WWW.AIMGLOBAL.ORG—Pharmaceutical Distributor Cuts Day of Safety Stock, Aug. 29, 2002.
Internet Article WWW.IDTECHEX.COM—Independent Market, Strategic and Technology Reports, Aug. 29, 2002.
Internet Article—WWW.READYMEALSINFO.COM—M&S Pilots RFID System for Fresh Food Operation, Sep. 4, 2002.
Internet Article—AUDFS.ENG.AUBURN.EDU—Auburn University Detection & Food Safety Center, Sep. 4, 2002.
RFID Journal—Internet Article—WWW.RFIDJOURNAL.COM—Auto-ID Center Opens Demonstration Lab in the U.K., Sep. 4, 2002.
Internet Article—WWW.AUTOIDCENTER.ORG—Transmitting ePC Codes, Aug. 26, 2002.
Internet Article—WWW.ELECTRONICIDINC.COM—Destron-Fearing Electronic ID Background, Sep. 4, 2002.
Internet Article—DESTRONFEARING.COM—Applications-Companion Animals, Sep. 4, 2002.
Interent Article—AUDFS.ENG.AUBURN.EDU—Auburn University—Detection & Food Safety Center, Sep. 4, 2002.
Internet Article—SFGATE.COM—Shops Try Chips for Tracking Every Move by Client 'Tribe' Monitoring Systems Note What Catches Customers' Eyes, Aug. 6, 2002.
Internet Article—WWW.AIMGLOBAL.ORG—Radio Frequency Identification—RFID a Basic Primer, Sep. 28, 1999.
Internet Article—WWW.AIMGLOBAL.ORG—Common Applications—RFID, Jul. 23, 2002.
Internet Article—WWW.USATODAY.COM—New Chips Could Make Everyday Items 'Talk', Jul. 23, 2002.
Forbes Magazine—The Internt of things, Mar. 18, 2002.
Auto-ID Center—Institute for Manufacturing, University of Cambridge—WhitePpaper—Auto-ID Based Control—an Overview, Feb. 1, 2002.
Wireless Handhelds—Beam Up Some Information, Scotty, Control Engineering, May 2002.
Scientific American—Wireless Data Blaster, May 2002.
Auto-ID Center, Institute for Manufacturing, University of Cambridge, White Paper—The Intelligent Product Driven Supply Chain, Feb. 1, 2002.
Auto-ID Center Massachusetts Institute of Technology—White Paper—Smart Medicine—The Application of Auto-ID Technnology to Healthcare, Feb. 1, 2002.
U.S. Appl. No. 10/301,879, filed Nov. 21, 2002.
U.S. Appl. No. 10/301,882, filed Nov. 21, 2002.
U.S. Appl. No. 10/301,877, filed Nov. 21, 2002.
U.S. Appl. No. 10/301,846, filed Nov. 21, 2002.
U.S. Appl. No. 10/301,883, filed Nov. 21, 2002.
U.S. Appl. No. 10/301,549, filed Nov. 21, 2002.
"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPER-RevE.pdf.
Popular Science, What's New, Suzanne Kantra Kirschner, We've heard hypersonic sound. It could change everything. Exemplary applications of hypersonic technology are illustrated at www.popsci.com/popsci/hometech/article/0.12543.351353.00.html.
D. McFarlane, "Auto-ID Based Control," White Paper for the Auto-ID Centre Institute for Manufacturing, University of Cambridge, Cambridge. United Kingdom, Feb. 1, 2002. Available at http//www.autoidcenter.org/research/CAM-AUTOID-WH-004.pdf.
Chien Yaw Wong, "Integration of Auto-ID Tagging System with Holonic Manufacturing Systems," White Paper for the Auto-ID Centre Institute for Manufacturing, University of Cambridge, Cambridge, United Kingdom, Sep. 2001. Available at www.autoidcenter.org/research/CAM-WH-001.pdf.

Wincor Nixdorf, Member of Metro Group, Future Store Initiative, "Store Vision—High-Tech for the Future in Retail," Wincor Vision May 2003. Available at http:/www.wincor-nixdor.com/internet/com/Idustries/Retail/WincorVision/WincorVisionSpezialFSI,templateId=blob.jsp.property=Data.pdf.

AMSKAN Editorials, RFID Overview: The science of evaluating RFID (Radio Frequency Identification) Technology, AMSKAN Update: Jan. 1999. Available at www.amskan.com/html/rfid_overview.html.

Ludwig Weimann and Junru Wu Transdermal Drug Delivery by Sono-Macroporation http://ultra-sonictechnologies.com/cancun-presentation.htm Nov. 4, 2003 11:28:14 AM.

\* cited by examiner

RFID SYSTEM AND METHOD FOR ENSURING FOOD SAFETY

TECHNICAL FIELD OF THE INVENTION

The present invention relates generally to the field of food safety, and more particularly to a system and method for ensuring food safety, dietary or nutritional requirements, and food preferences.

BACKGROUND

Radio Frequency Identification Devices (RFIDs) are low-cost, passive "smart" chips or "tags" that can be embedded in or attached to articles, products, and the like to convey information about the product via a scanner. The smart tags are generally small labels or the like with a miniature embedded antennae. The tags may be passive or active, the active tags requiring an internal power supply. A reader or scanner interrogates the smart tag with an electronic signal. The tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that will feed targeted commercials and special offers to consumers. (See, "They Know What You Eat," by Kayte VanScoy, Smart Business, January 2001).

The present invention relates to a novel implementation of RFID technology in the fields of food safety, nutritional, and dietary applications.

Food allergies are a particular health concern for many individuals. Such allergies can cause a variety of symptoms, such as hives, nausea, skin rash, migraine headaches, asthma-type symptoms, flushing, tremors, swelling or itching, cramping, vomiting, and diarrhea. In severe cases, anaphylactic shock may occur, which can result in breathing difficulty, irregular heart beat, decreased blood pressure, and even death. Because of the seriousness of such reactions, those at risk must be alerted to food products containing the problematic allergens. Presently, such individuals must read the ingredients listed on the labels of the food products to avoid ingredients that may cause potentially serious allergic reactions. This can be inconvenient, inaccurate (e.g., missing, misprinted, or incomplete information on the labels) and, in certain cases, impossible for many individuals with impaired sight or who cannot otherwise read or comprehend the printed labels (illiteracy, different native tongue, etc).

Consumers also read food product labels for other reasons. For example, with the growing awareness and appreciation of the health risks associated with obesity and excess weight, dietary and nutritional considerations are an important concern for many individuals. Individuals on mandatory or voluntary diets typically must account for their caloric and fat intake on a regular basis, typically on a daily basis. Other individuals may wish to avoid meat products and by-products for religious, moral, or other reasons. Individuals with particular medical conditions or taking medications may need to avoid certain types of foods. For example, individuals with hypertension may wish to avoid sodium. Presently, for all such situations, reliance is generally placed solely on the dietary or nutritional information printed on the food packaging labels. Again, this can be inconvenient and, for certain individuals, not possible.

The present invention provides a RFID system and methodology that may greatly facilitate shopping for those individuals with particular food and dietary concerns.

SUMMARY

Objects and advantages of the invention will be set forth in the following description, or may be obvious from the description, or may be learned through practice of the invention.

A RFID methodology and system according to the invention involves, in general aspects, the incorporation of smart tags with food products, the smart tags being associated with information about the food products, such as ingredients, and nutritional and dietary information. The associated information can be preprogrammed into the smart tag itself, of can be in a database where it is associated with an electronic product code programmed in the smart tag. Smart tag scanners are made available to consumers in a number of conceivable scenarios according to the invention for conveying the food product information to consumers. The scanners can retrieve information from the smart tags which can be used to assess the safety of the associated food products. Retrieving information may include reading a product code from the smart tag and then looking up associated product information in a product database, and then determining if the product is compatible with the needs and restrictions of a consumer. In this way, consumers with special food allergy, dietary, medical, or nutritional concerns may make informed decisions prior to purchasing or consuming the food products.

In one particular method and system for providing consumers with food product information, the food products are labeled or attached with smart tags. The smart tags contain coded information regarding the food product. For example, the coded information may include or provide access to information about the ingredients of the food product, dietary and nutritional information such as calories, fat grams, carbohydrates, compatibility with known medications or medical conditions, etc. In general, the food product information is that type of information which is of particular concern to consumers with food allergies, dietary requirements, or other medical conditions.

Prior to purchase or consumption, consumers use a smart tag scanner configured to retrieve the food product information associated with the smart tags, to decode the information, and present the information in a usable form to the consumer. The smart tag and scanner system may utilize a passive smart tag wherein the smart tag responds to an excitation signal generated by the scanner by transmitting its coded food product information in an electromagnetic pulse. In an alternative embodiment, the smart tag may be an active transmitter with an internal power supply that transmits its food product information upon receipt of a request from the scanner. With either type of system, consumers are provided with the ability prior to purchasing or consuming food products to retrieve important food product information, and to make an informed decision as to whether to purchase or consume the food product based on the information.

There are various scenarios wherein the consumers are "provided" with the scanners. In one scenario, the scanners are individual devices, such as hand held devices, that may be owned or individually maintained by consumers. For example, the consumer would merely bring the scanner to the market with them. In another scenario, the scanners may be provided to the consumers by the commercial business establishment. For example, a market may maintain any number of scanners that are assigned to customers as they enter the store. In still a further scenario, the scanners may be disposed in shopping carts or baskets used by the consumers. Alternatively, the scanners may be provided at the point of checkout prior to the consumer actually purchasing the food items.

It may be desired in certain situations to program the scanners with consumer specific food product profiles, or to link the scanner to a database or other electronic source containing a food product profile. For example, a food product profile may include an individual's food allergies, food preferences, dietary or nutritional requirements, medications, and the like, and can comprise a list of food items or ingredients in food items that are incompatible with the health or preferences of the user, such as ingredients incompatible with a medication taken by the user or a list of food allergens or religiously proscribed ingredients. In the scenario wherein the food scanner is individually owned or maintained by the consumer, the food product profile may be permanently stored in the scanner. In alternative embodiments wherein the scanners are provided to the consumers, for example upon entering the supermarket, consumer specific food product profiles may be downloaded into the scanners. The food product profiles may be electronically stored or maintained by the business establishment for their customers with any suitable hardware/software architecture. Consumers may undergo a "registration" process wherein their particular food product profile is generated and stored by the business establishment.

In an alternative embodiment, the consumer's food product profile may be stored on a "portable" storage device, such as a smart card, magnetic strip, computer disk, or other suitable storage means. The consumer may bring the portable device to the market wherein the profile is subsequently loaded or read into the scanner.

The scanners may be programmed to automatically alert the consumer if a scanned product represents a "non-acceptable" item. For example, the scanned item may contain an ingredient that, according to the consumer's food product profile, may cause an allergic reaction for the consumer, or conflict with medication the consumer is taking. Alternatively, the consumer may be alerted that the product may exceed a dietary or nutritional requirement of the consumer. The product may, for example, contain excessive calories, fat grams, carbohydrates, etc., that violates a consumer's diet requirements or preferences as set forth in the food product profile. In a less sophisticated version, the scanner may simply provide a visual display to the consumer of the ingredients and dietary information, wherein the consumer may base their decision on the displayed information. This type of information may be considered as "non-consumer specific" food product information.

In an alternative configuration, the smart tag code may also include or serve as a link to a remote database that contains additional information about the food product. For example, the code may contain a URL link to an Internet website, or be interpreted to generate such a link. In this embodiment, the scanner may also include an Internet browser that uses the URL to access the website. The website may be maintained, for example, by the manufacturer of the food product, and provide such information as recipes for the food product, additional dietary information, related products, suggested substitute products, etc.

Additional aspects of the present methodology and system will be described below with reference to the figures.

DETAILED DESCRIPTION

Reference will now be made in detail to one or more embodiments of the invention, examples of which are graphically illustrated in the drawings. Each example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

Figure 1:
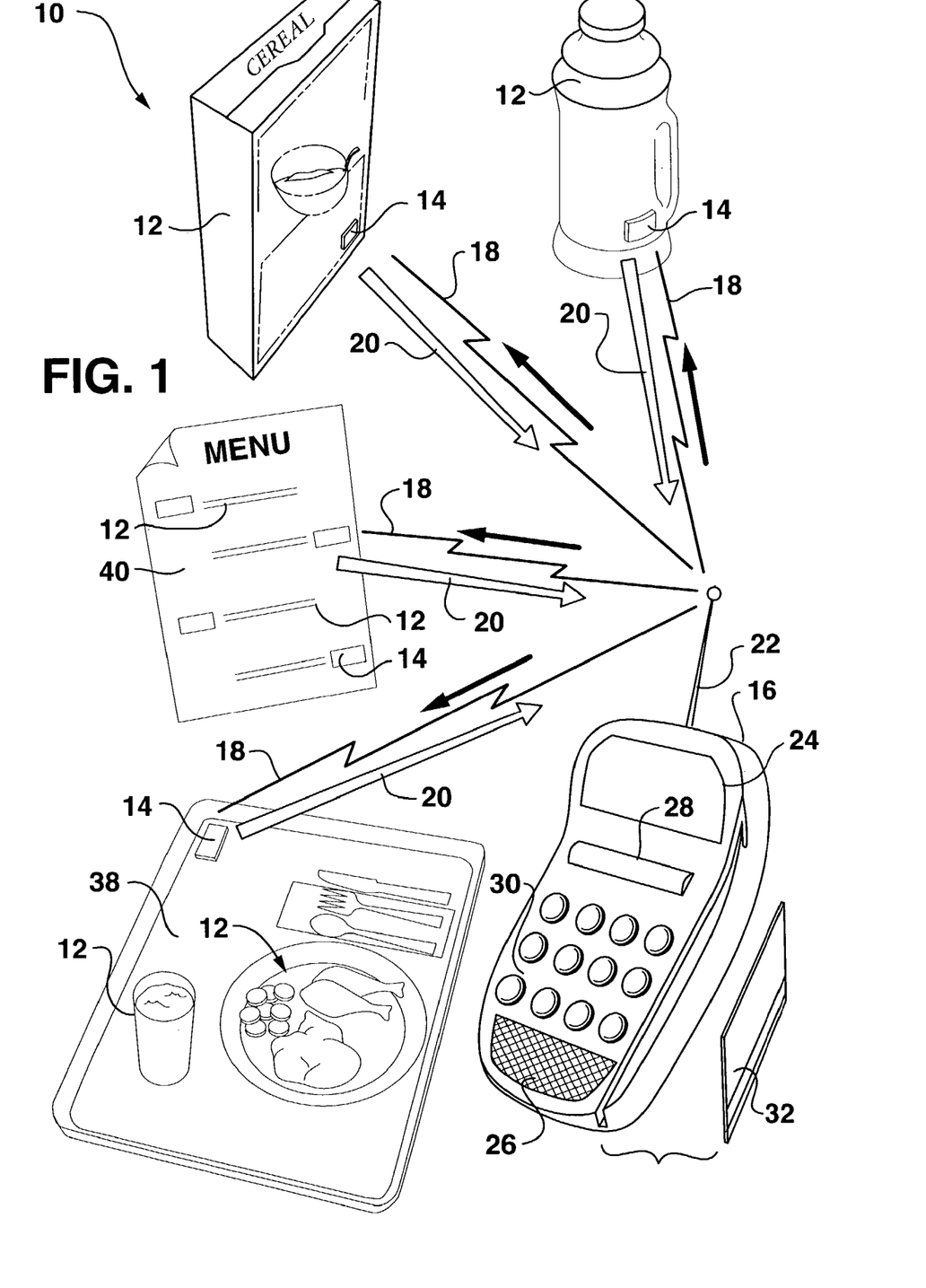
FIG. 1 is a graphic illustration of concepts according to a method and system of the invention.

FIG. 1 graphically illustrates conceptual aspects of a method and system 10 according to the invention. Any variation of food products 12 are provided with smart tags 14. As discussed in greater detail below, the tags 14 transmit a pulse of coded food product information 20 in response to an electronic "trigger" signal 18 from a scanner 16. The invention is not limited to any particular type of food product and may include, for example, dry boxed goods, liquids juices, milk, etc.), fresh foods, frozen foods, and so forth. It should also be appreciated that "food products" also includes prepared foods. For example, prepared food products 12 may be served on a tray 38 or other container that incorporates a smart tag 14, as conceptually illustrated in FIG. 1. Similarly, the smart tags 14 may be provided on menus 40 or other customer order devices that list or describe available food products 12. The smart tags 14 may be provided, for example, attached to the menu at a location adjacent the identification of a particular food product. The smart tags 14 may be "activated" by the consumer touching the tag 14, which results in a food product information signal 20 being transmitted to the scanner 16.

When provided directly with packaged food products, the smart tags 14 may be incorporated with the product packaging. For example, the smart tags 14 may be adhesive backed label-type tags that are attached to the food product package at a convenient location for subsequent scanning by the smart tag scanner 16. The food product information is not limited in scope, and may include, for example, information about all ingredients contained in the food product, the nature and quantity of any preservatives and artificial colors, sodium levels, cholesterol content, sugar level, nutritional and dietary information, the presence of animal products or by-products, yeast content, genetically modified material content, kosher status, the presence of dairy goods, packaging or manufacturing date, freshness level (e.g., days left until food is no longer considered fresh), and so forth.

Consumers are provided with or have the use of a smart tag scanner 16. The scanner 16 is configured to retrieve and decode the food product information from the smart tags 14. With conventional RFID "smart" systems wherein the smart tags 14 are passive devices, the scanner 16 emits the trigger excitation signal 18 received by an internal antennae in the smart tag 14. This signal 18 causes the smart tag 14 to generate and transmit an electromagnetic pulse containing the coded food product information signal 20. The coded signal 20 is received by the receiver antennae 22, decoded, and the food product information is presented to the consumer in various ways, as described in greater detail below.

RFID smart tag technology is known and understood by those skilled in the art, and a detailed explanation thereof is not necessary for purposes of describing the method and system according to the present invention. Generally, conductive or passive smart tags 14 consist of silicon or other semiconductors, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at http://www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf.

Other RFID technologies believed to be of value for the present invention include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacturer by laser fusing of polysilicon links in order to store a unique code on each tag.

Texas Instruments (Dallas, Tex.) offers RFID technology as part of Texas Instruments RFID (TI*RFID™) Systems, formerly known as the TIRIS© system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, antennas, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at http://www.idsystems.com/reader/1999_05/join0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

The antennae embedded within the smart tags 14 is generally one component of the device, though it is recognized that alternatives to antennas may exist in some applications. (For example, for some metallic objects, the smart tag need not comprise an antenna but the metallic object itself can serve as the antenna.)

The antennae embedded within the smart tags 14 may be a useful component of the device, though it is recognized that alternatives to antennas may exist in some applications. (For example, for some metallic objects, the smart tag need not comprise an antenna but the metallic object itself can serve as the antenna.) The excitation signal 18 from the scanner 16 must be received by the antennae to "activate" the smart tag. The received excitation signal 18 is the power source for the smart tag 14 and results in the generation of the electromagnetic pulse containing the coded food product information signal 20. A detailed description of RFID smart tag antennas may be found in U.S. Pat. No. 6,320,556 B1, incorporated herein by reference for all purposes.

In an alternate embodiment, the smart tags 14 may be active devices. In this configuration, the smart tag 14 includes active transceiving circuitry that has the capability to selectively respond to coded request signals transmitted by a scanner 16. The active smart tag 14 may include the capability to receive and store additional information beyond the information contained in its fixed code. An active smart tag 14 requires an internal power supply, such as a micro-battery, thin film battery, or the like.

The food product information signal 20 may include a link or code to a remote database having additional food product information, or may be interpreted to automatically provide such a link or code. This link or code may enable the scanner 16 to communicate with such database by conventional wireless technology. For example, the signal 20 may include a URL code to launch an Internet browser application. In this way, the scanner 16 may provide the consumer with Internet access to websites containing additional information about the food product. In this embodiment, the scanner 16 is also an internet accessible wireless device, such as a PDA (Personal Data Assistant). A keyboard 30 may be provided with the scanner 16 for interactive communication via the Internet. The websites may be maintained by, for example, the manufacturer, supplier, or vendor of the food product.

The RFID scanner 16 may be of conventional hardware and software architecture. The scanner 16 receives the coded food product information signal 20, and decodes the signal into usable commands and data. The scanner 16 includes a microprocessor and software programs for this purpose. The scanner 16 provides an output to the consumer that may be in various forms. For example, the scanner 16 may visually display the ingredients or components of the food product 12 by way of a visual display screen 24. Alternatively, the scanner 16 may include any configuration of visual alarm 28 or audible alarm 26 to automatically alert the consumer if the food product 12 contains ingredients that the consumer may be allergic to, or that may conflict with the consumer's dietary requirements or concerns. In one embodiment, the alarm 28 can comprise a narrow beam of sound targeted to the consumer or other individual, using hypersonics sound technology from American Technology (San Diego, Calif.), as described more fully in a white paper, "Theory, History, and the Advancement of Parametric Loudspeakers: A Technology Overview," by James J. Croft and Joseph O. Norris, Revision D, American Technology Corporation, San Diego, Calif., 2002, available at http://www.atcsd.com/pdf/HSSWHTPA-PERRevD.pdf. Exemplary applications of hypersonic technology are illustrated at www.popsci.com/popsci/hometech/article/0,12543,351353,00.html.

The scanner 16 may provide "non-consumer-specific" information, such as a listing of the ingredients in the food product, and dietary and nutritional information. In a more sophisticated embodiment, the scanner 16 processes and analyzes the food product information signal 20 in accordance with a consumer-specific food product profile that has been entered into or stored in the scanner 16. This profile may include, for example, an individual consumer's food allergies, food preferences, nutritional requirements, dietary requirements, medications or medical conditions, and the like. If the scanned food product 12 contains an ingredient that conflicts with the consumer's food product profile, the scanner 16 may emit any suitable alarm, as well as a visual explanation or indication as to the reason for the alarm. For example, the consumer may be allergic to peanuts and the scanner 16 may issue a visual and audible alarm when a container of peanut butter is scanned.

The consumer's food product profile may be entered into the scanner 16 in any number of various scenarios. For example, the food product profiles may be entered into the scanner by way of a smart card 32 (or a smart tag associated with a food profile for the individual) that is swiped or otherwise read by the scanner 16. Such cards may be promoted by a business as a type of "loyalty" card. The consumer may carry this card on their person and simply swipe the card with a scanner provided by the market, restaurant, food service establishment, or the like. In an alternate scenario, the scanners may be individually owned or maintained by consumers wherein the consumer's respective food product profile is permanently stored in the scanner 16. In an alternate scenario, the market, restaurant, food service establishment, maintains customer's food preference profiles on "electronic file" and enters the profiles into a scanner 16, and provides the scanner to the customer. Any number of scenarios are conceivable in this regard.

Figure 2:
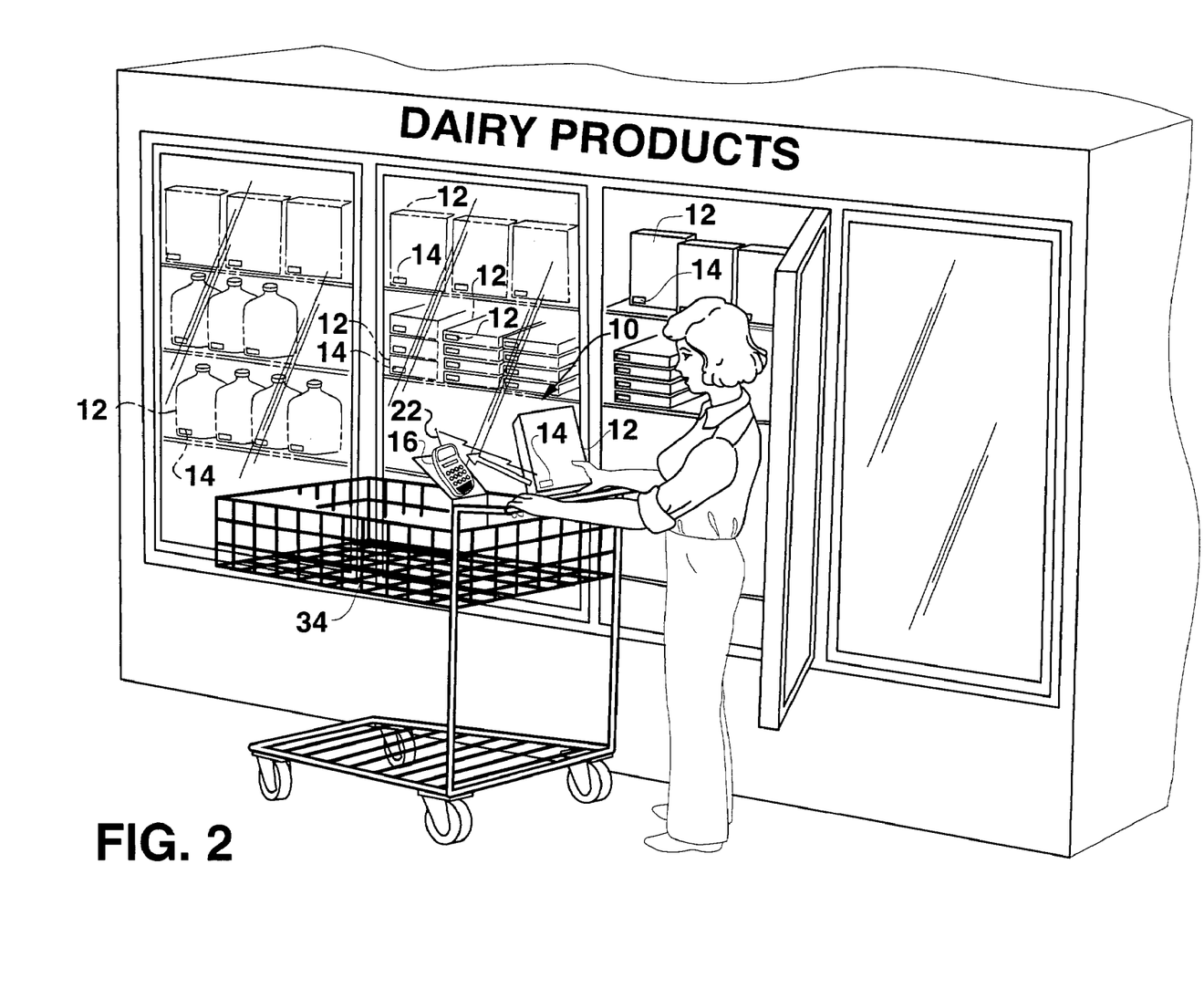
FIG. 2 is a graphic illustration of an alternate method and system according to the invention.

FIG. 2 graphically illustrates a supermarket scenario. In this embodiment, the system 10 includes products 12 with associated smart tags 14 provided on the store shelves, counters, refrigeration units, freezers, etc. A shopping cart 34, or any other basket or device used by the consumer to gather food products, is provided with a "permanent" scanner 16. The scanner 16 is desirably mounted for easy access and visibility by the consumer. For example, the scanner 16 may be mounted behind the handle of the cart 34, as illustrated in FIG. 2. With this type of configuration, the consumer may select a food product 12 and scan the product 12 by bringing it within relatively close proximity to the scanner 16. The food product information will then be displayed to the consumer.

Figure 3:
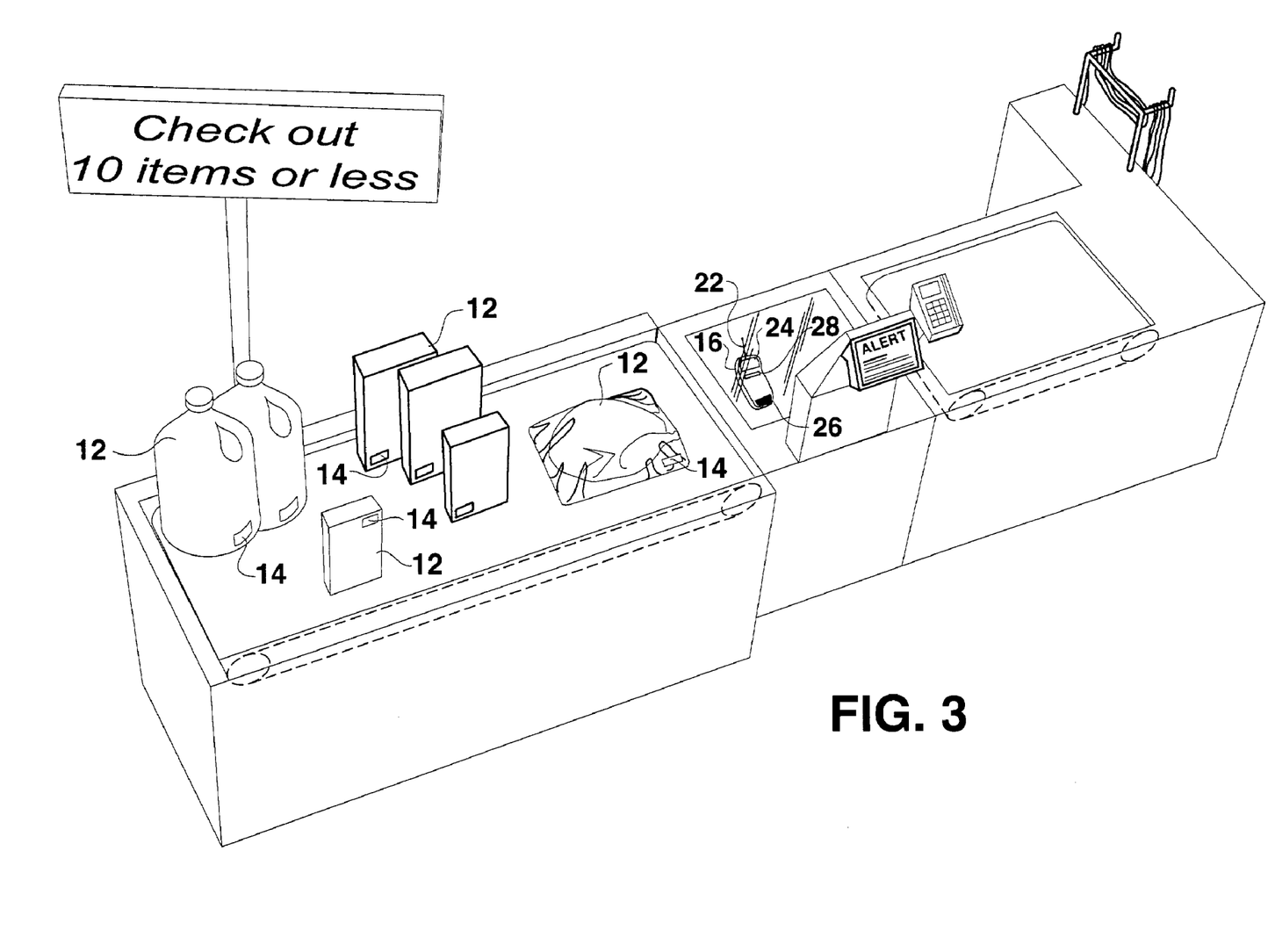
FIG. 3 is a graphic illustration of yet another embodiment of the method and system according to the invention.

FIG. 3 conceptually illustrates an alternative market scenario wherein the scanner 16 is provided at a point of checkout, such as at the sales register. As the food products 12 are conveyed past the scanner 16, the food product information is displayed to the consumer. In this particular embodiment, the consumer may swipe a smart card containing their food profile through the scanner 16 prior to the food products 12 being scanned. If a food product profile is not intended or available for a consumer, the scanner 16 may simply display non-consumer specific food product information, such as a listing of the ingredients in each food product.

It should be appreciated that the scanner 16 can be configured to accommodate consumers having visual impairment, language difficulties, illiteracy, etc. For example, the scanners may be configured with audible or visual alarms that indicate when a scanned food product 12 conflicts with a consumer's food product profile. The scanner 16 may contain a visual display 24 that conveys the food product information in different languages. The scanner 16 may omit voice messages in selected foreign languages. Various configurations of the scanner 16 in this regard are within the scope and spirit of the invention.

It should also be appreciated that the system and method according to the invention is not limited to any particular commercial business, but has application wherever food products are delivered or consumed. For example, the system is applicable in hospitals, nursing homes, and other health care environments to reduce the risk that inappropriate foods are given to a patient or monitored person. A scanner 16 associated with a patient or monitored person may be programmed with information about the medical condition of the patient, prescribed medications, potential dietary conflicts caused by harmful interactions with certain foods or drugs, and so forth. With this scenario, the system and method may serve to protect unconscious or unaware individuals from potentially harmful food safety issues.

It should be appreciated by those skilled in the art that the system and method according to the invention have wide applications, and that the example and embodiments set forth herein are merely exemplary. It is intended that the present invention include such uses and embodiments as come within the scope and spirit of the appended claims.

What is claimed is:

1. A method for providing consumers having food allergies, medical conditions, or dietary concerns with information about food products prior to purchasing or consuming such products, said method comprising:

providing food products with smart tags, the smart tags being associated with information regarding the food product that is of interest to consumers with food allergies, medical conditions, or dietary concerns;

scanning the food products prior to purchase or consumption with a smart tag scanner, the scanner configured to retrieve the food product information associated with the smart tags and to store the consumer's specific personal profile;

providing the consumer's specific personal profile containing data stored only on the smart tag scanner, the data regarding the consumer's food allergies and medical conditions or medications taken by the consumer that are affected by food products or require particular dietary requirements;

conveying at least portions of the food product information to the consumer, including having the smart tag scanner alone compare the scanned food product information with the consumer specific profile and alerting the consumer with the scanner if any scanned food product is incompatible with any one of the consumer's food allergies, medications, or medical conditions; and wherein the smart tag scanner is a portable hand-held, unit that is personally owned and maintained in the possession of the consumer and brought by the consumer to the place of purchase or consumption of the food products, wherein the consumer's specific food product profile is stored on a smart card scanned by the consumer's scanner and wherein a commercial business providing the food products previously has given the scanner to the consumer.

2. The method as in claim 1, wherein the food product information contains the ingredients of the food product.

3. The method as in claim 1, wherein the food product information contains dietary information about the food product.

4. The method as in claim 1, wherein the scanner emits an auditory or visible alarm.

5. The method as in claim 1, wherein the scanners previously given to the consumers display the same type of non-consumer specific food product information to all consumers.

6. The method as in claim 1, wherein the consumers load consumer specific food product profiles into the scanners previously given to the consumers by the commercial business.

7. The method as in claim 1, wherein the scanners are carried in carts or baskets supplied by the commercial business.

8. The method as in claim 1, wherein the scanners are operated at a point of checkout.

9. The method as in claim 1, wherein the food product information includes a link to a remote database having information regarding the food product.

10. The method as in claim 9, wherein the scanner accesses the remote database and displays information therefrom to the consumer.

11. The method as in claim 10, wherein the remote database is an Internet site, the scanner being an Internet accessible device.

12. The method as in claim 11, wherein the Internet site is maintained by a manufacturer of the food product.

13. The method as in claim 1, wherein the smart tags are attached to packaging of the of the food product.

14. The method as in claim 1, wherein the smart tags are provided for a prepared meal prior to a consumer eating the meal, the food product information relating to the various food products of the meal.

15. The method as in claim 14, wherein the smart tags are provided by food service establishments on containers or trays served with the meal.

16. The method as in claim 1, wherein the smart tags are provided by food service establishments with menus.

17. A food product safety system for protecting consumers with food allergies and dietary concerns or requirements, said system comprising;

smart tags associated with food product information for particular foods, said food product information being of the type required by consumers with food allergies or dietary concerns related to medical conditions or medications taken by the consumer, said smart tags attachable to their respective food products; and at least one smart tag scanner accessible to a consumer at a point of sale of the food products, said scanner being a portable hand-held unit of an individual consumer that is maintained in the possession of the consumer and brought by the consumer to the place of purchase or consumption of the food products and wherein said scanner is configured to read the consumer's specific profile stored on a consumer specific smart card, said scanner configured to retrieve said food product information associated with said smart tags and compare the scanned food product information with a consumer specific profile storable only on said scanner from said consumer specific smart card controlled only by the consumer, the smart tag scanner being configured so as to preclude access to the consumer specific profile by any device other than the said scanner, the profile containing data regarding the consumer's food allergies and medical conditions or medications taken by the consumer that are affected by food products or require particular dietary requirements, and the scanner being configured to alert the consumer if any scanned food product is incompatible with any one of the consumer's food allergies, medications, or medical conditions.

18. The system as in claim 17, wherein said food product information comprises ingredients of the food product.

19. The system as in claim 17, wherein said food product information contains dietary information about the food product.

20. The system as in claim 17, wherein said scanner comprises at least one of an auditory and visible alarm.

21. The system as in claim 17, wherein said scanner is disposed in a cart or basket at a commercial business selling the food products to consumers.

22. The system as in claim 17, wherein said scanner is disposed at a point of checkout at a commercial business selling the food products to consumers.

23. The system as in claim 17, wherein said food product information comprises a link to a remote database having information regarding the food product.

24. The system as in claim 23, wherein said remote database is an Internet site, said scanner being an Internet accessible device.

* * * * *